3,734,793
NITROCELLULOSE COMBUSTIBLE COMPOSITION HAVING SALT OF POLYETHYLENIMINE AS OXIDIZER

John S. Lory, Commack, N.Y., and Suzanne T. Purrington, Raleigh, N.C., assignors to Lory Industries Inc., Deer Park, N.Y.
No Drawing. Filed Dec. 29, 1971, Ser. No. 213,854
Int. Cl. C06b 5/00
U.S. Cl. 149—100      4 Claims

ABSTRACT OF THE DISCLOSURE

The stabilized combustible plastic compositions comprise nitrocellulose, an oxidizer, a plasticizer and a stabilizer and are capable of combustion in a vacuum and leave a minimum of residue upon combustion. They are compounded with the aid of a solvent and are cast and cured for a variety of uses, e.g., shell cases and increment containers for artillery and mortar ammunition. An illustrative embodiment is a composition consisting essentially of nitrocellulose, perchlorate salt of polyethylenimine as oxidizer, dioctyl adipate and camphor as plasticizer and ethyl centralite and an organotin compound as stabilizer.

---

The present invention relates to novel stabilized combustible plastic compositions and to methods of preparing them. More particularly, this invention pertains to stabilized combustible plastic compositions which consist essentially of nitrocellulose, an oxidizer, a plasticizer and a stabilizer and which are capable of combustion in a vacuum and leave a minimum of residue upon combustion.

Prior to this invention, stabilized combustible plastic compositions which satisfied simultaneously the following important requirements or specifications: capability of rapid combustion in a vacuum and capability of combustion with a minimum of residue, coupled with a high degree of tensile strength and substantial non-hygroscopicity, and which could be employed to replace other materials including metals in a number of variegated fields, have not come into use. It is therefore an objective of this invention to provide stabilized combustible plastic compositions fulfilling the above requirements or specifications. Other objects and advantages will become apparent from the following description.

These objectives can be accomplished by providing materials which are composed of the above mentioned four major components, namely, nitrocellulose, oxidizer, plasticizer and stabilizer, compounded or prepared as described below.

In accordance with the present invention and as stated above nitrocellulose is one of the four major components. The nitrocellulose utilized in the compounding of the subject compositions is technically designated as lacquer grade whose nitration range may vary from 9.0 to 12.2%. In addition, the viscosity of the nitrocellulose may vary from one-quarter of a second to over one thousand seconds, when checked in a 55/25/20 mixture of toluene/2B ethyl alcohol/85% ethyl centralite utilizing a steel ball with a 12.2% concentrated solution.

The oxidizing substance which is present in the subject compositions is a polyethylenimine perchlorate or nitrate salt. This salt is prepared by the neutralization of polyethylenimine having a molecular weight up to 30,000 with aqueous perchloric ($HClO_4$) or nitric ($HNO_3$) acid in a concentration of up to 70%. The perchloric or nitric acid—or in the form of, e.g., ammonium perchlorate or ammonium nitrate—is added cautiously with cooling being provided to the polyethylenimine until a pH in the range of 1.5 to 7.0 is obtained. Specific illustrative examples of the mode of preparation of this oxidizer are given below in Examples 1 to 3.

The oxidizer is present in the subject compositions generally at ratios varying between 1 to 4 parts per part of nitrocellulose. There is no preferred ratio or range of ratios; the ratio desired and employed rather depends on the field of use as can be seen below.

The third important component of the subject compositions is a plasticizer. According to the concept of this invention the plasticizer can be a single plasticizing substance or a combination of such substances. The precise nature and composition of the plasticizer is not critical the only requirement being compatibility with nitrocellulose.

Thus, as will be appreciated by men skilled in the art, solvent-type plasticizers such as dialkyl phthalates or adipates, e.g., dibutyl and dioctyl phthalates, dioctyl and diethylhexyl adipates; triaryl phosphates, e.g., triphenyl and tricresyl phosphates and camphor can be employed but, in addition, non-solvent types of plasticizers such as both raw and blown castor oils, blown soya, treated linseed, tung and other non-drying oils are also operative. The above-mentioned solvent type plasticizers, however, are preferred. For further details regarding the type of plasticizer that can be employed and the characteristics and properties that it should possess, reference is made to page 14 of the published Du Pont Bulletin A–43614 entitled "Nitrocellulose."

The plasticizer is present in the subject compositions at a ratio of between 0.1 and 0.8 part per part of nitrocellulose, the exact ratio also depending on the particular use contemplated for the subject compositions.

The fourth and last important component of the compositions of the present invention is a stabilizer. The stabilizer can also be present as a single compound or as a combination of compounds. While any known stabilizer for nitrocellulose can be utilized alone or in combination with others, ethyl centralite which is chemically sym-diethyldiphenyl urea ($N,N^1$-diethyldiphenyl urea) or $N,N^1$-diethylcarbanilide, is particularly preferred as a stabilizing substance. When a second stabilizer is employed, which is the preferred procedure, any of the organotin compounds described in U.S. Pats. Nos. 2,641,-596, 3,565,930, and 3,565,931 as well as in U.S. application Ser. No. 793,503, filed Jan. 23, 1969, now U.S. Pat. No. 3,640,953, issued Feb. 8, 1972, are preferably used. It is particularly advantageous to utilize organotin mercapto carboxylic acid ester sulfides, e.g., dibutyltin diisooctyl thioglycolate or monobutyltin triisooctyl thioglycolate or stabilizing products containing these. These organotin stabilizers are sold by the Argus Chemical Corporation as e.g., MARK 292, 534B, 649A, 1213, 1316, 1493 stabilizers.

Of the stabilizer there is incorporated in the subject compositions 0.02 to 0.2 part per part of nitrocellulose depending on the properties desired for the contemplated end use. Where a second stabilizer is employed, e.g., an organotin compound, it is present at a ratio of up to 0.13 part per part of nitrocelulose.

For some of the applications illustrated below, the subject compositions can also contain, as additional component, a black dye to eliminate or reduce ultraviolet radiation and prevent discoloration. For example, carbon black or nigrosine can be used in amounts of up to 2% by weight of total composition, predispersed or suspended in the nitrocellulose solution.

The above-described individual components are compounded to prepare the compositions of this invention in accordance with the following general procedure: The nitrocellulose is dissolved in a minimum of solvent. The solvent can be any solvent known to be useful for nitrocellulose including, without limitation, aliphatic alcohols, acetone and ethyl acetate. To this nitrocellulose solution there is added a mixture of oxidizer, plasticizer or stabilizer—and dye if employed—all dissolved in the same or in another solvent. The resulting formulation is placed in a mixer to evaporate a portion of the solvent for up to several hours. The resulting slurry is then placed in a hopper with a gate opening set for a desired thickness and is then cast on a moving conveyor. After curing, the desired stabilized combustible plastic composition is obtained.

The components or starting materials employed in manufacturing or compounding the subject compositions are, to the extent their preparation is not more fully disclosed herein, either commercially available or are readily prepared in accordance with well known or published art methods.

The final compositions thus obtained are substantially non-hygroscopic and non-autocatalytic and have a high degree of tensile strength. They are capable of generating sufficient oxygen while burning to support their own complete combustion independent of the atmosphere, i.e., in an atmosphere of little or no oxygen. These compositions are further capable of combustion with a minimum of residue, i.e., less than 1% and in no case more than 2% by volume, the residue being in a dry, powdery form that does not present any of the residue problems incident to conventional combustible materials.

With these unique properties, the compositions of this invention find many practical applications. For instance, the subject compositions are eminently suitable and useful as a container material for propellants utilized in a variety of military applications, e.g., as shell or cartridge cases or increment containers for the propulsion of artillery, rifle or mortar ammunition of various calibers. The difficulty in finding a suitable material for replacement of metal cases presently utilized in ammunition lies in what is generally referred to as "reducing atmosphere condition" in the barrel or breech section of an artillery rifle. This limitation in oxygen supply is a serious consideration in the design of projectile chemicals utilized to expel a warhead from a rifle barrel. Any material intended as a substitute for a metal shell case must of necessity cause no additional drain on the limited oxygen contained in the breech section of the rifle. Any substitute material has to be capable therefore of rapid burning independent of the limited atmosphere in a rifle barrel. The compositions of the present invention obviate this difficulty and present an excellent solution.

Additional typical uses for the subject compositions are in printed circuit boards for quick destruction and in quick-destruct file folders and magnetic tapes. Also survival matches with napalm and an ignition system inside and flechettes with tails for tracer purposes can be made out of these compositions.

The above enumeration of uses is merely illustrative and exemplary and in no way exhaustive as will be obvious to men skilled in the art.

The compositions of this invention as well as their mode of preparation are more fully illustrated in experimental detail by the following examples. The scope of this invention is, however, not limited thereto.

EXAMPLE 1

Polyethylenimine of a molecular weight of 600 and whose basic pH in a 5% aqueous solution is 10.6 is neutralized by cautiously adding perchloric acid ($HClO_4$) of a 70% concentration with water until a pH of 6.0 is obtained.

EXAMPLE 2

Polyethylenimine of a molecular weight of 1200 and whose basic pH in a 5% aqueous solution is 10.6 is neutralized by cautiously adding perchloric acid ($HClO_4$) of a 70% concentration with water until a pH of 4.5 is obtained.

EXAMPLE 3

Polyethylenimine of a molecular weight of 1800 and whose basic pH in a 5% aqueous solution is 10.6 is neutralized by cautiously adding perchloric acid ($HClO_4$) of a 70% concentration with water until a pH of 2.0 is obtained.

EXAMPLE 4

248 grams of nitrocellulose are dissolved in 500 ml. of ethyl acetate. Added to this solution is a mixture consisting of 134 grams of polyethylenimine perchlorate salt, 23.5 grams of MARK 292 organotin stabilizer, 12.5 grams of ethyl centralite, 20 grams of camphor and 60 grams of dioctyl adipate dissolved in 250 ml. of the same solvent. The resulting formulation is placed in a mixer to evaporate a portion of the solvent for about two hours. The resulting slurry is then placed in a hopper with gate opening set for a designated thickness. The material is cast by this means on a moving conveyor and after curing, the new plastic composition results.

EXAMPLE 5

1250 grams (50% by weight of total composition) of nitrocellulose are dissolved in 3850 ml. of ethyl acetate. Separately, a mixture is made up consisting of the following: 625 grams (25%) of polyethylenimine perchlorate, 88 grams (3.5%) of ethyl centralite, 325 grams (13%) of dioctyl adipate and 217 grams (8.5%) of camphor. This mixture is dissolved in 500 ml. of ethyl acetate, added to and thoroughly mixed with the nitrocellulose solution. The final combustible plastic composition is then worked up and cast with the hopper gate opening being set at 0.045 inch resulting in cured sheets of a thickness of 0.012 inch.

EXAMPLE 6

Following the procedure set out in Examples 4 and 5 a slurry is prepared from the following components: 1250 grams of nitro-cellulose (11.8% nitrogen), 625 grams of polyethylenimine perchlorate (pH 2.5), 125 grams of MARK 292 organotin stabilizer, 56 grams of ethyl centralite and 250 grams of camphor. There is used a total of 2900 ml. of ethyl acetate as solvent in carrying out this procedure. A small quantity of this slurry is poured into a shallow watch glass and pins of flechettes are coated by dipping the ends into the slurry. These flechettes imbedded in cardboard with the fin section downward are then allowed to cure.

Compositions made in accordance with the above examples have shown a high degree of stability in standard stability tests. Based on these stability test data it has been projected that these compositions would remain stable for a ten year storage period at a temperature of 165° F. In cold temperature exposure tests at −65° F. no embrittlement was noted after 4 to 6 hours.

In high-pressure nitrogen-atmosphere burning rate tests it has been shown that these compositions whether uncoated, or coated with black paint, or dipped in water have a burning rate at 10,000 p.s.i. of between 1.4 and 2.6 inches per second.

In tensile strength determinations at 73° and −65° F. these compositions showed tensile strength of about 5000 to about 10,000 p.s.i. and elongation of about 10 to about 41%.

What is claimed is:

1. A stabilized combustible plastic composition comprising nitrocellulose, from 1 to 4 parts per part of nitrocellulose of an oxidizer selected from the group consisting of perchlorate and nitrate salts of polyethylenimine, from 0.1 to 0.8 part per part of nitrocellulose of a plasticizer selected from the group consisting of dialkyl phthalates and adipates, triaryl phosphates, camphor and castor, soya, linseed, and tung oils and combinations thereof, and from 0.02 to 0.2 part per parts of nitrocellulose of a stabilizer or a combination of stabilizers for nitrocellulose.

2. A stabilized combustible plastic composition according to claim 1, wherein said oxidizer is the perchlorate salt of polyethylenimine, said plasticizer is selected from the group consisting of dibutyl and dioctyl phthalates, dioctyl and diethylhexyl adipates, triphenyl and tircresyl phosphates and camphor and combinations thereof, said stabilizer is ethyl centralite alone or in combination with an organotin compound, which composition upon completion of combustion leaves a powdery residue of less than 2% by volume.

3. A stabilized combustible plastic composition according to claim 1, wherein said oxidizer is the perchlorate salt of polyethylenimine, said plasticizer is a combination of dioctyl adipate and camphor, said stabilizer is a combination of ethyl centralite and dibutyltin diisooctyl thioglycolate, which composition is capable of combustion in a vacuum and leaves upon combustion a powdery residue of less than 1% by volume.

4. A stabilized combustible plastic composition according to claim 1, wherein a black dye is present as an additional component in amounts up to 2% by weight of total composition.

References Cited
UNITED STATES PATENTS

| | | | |
|---|---|---|---|
| 2,960,393 | 11/1969 | Barr | 149—100 X |
| 3,554,819 | 1/1971 | Sayles | 149—44 X |

STEPHEN J. LECHERT, Jr., Primary Examiner

U.S. Cl. X.R.

149—94, 95, 98